US012612166B2

(12) United States Patent　　　(10) Patent No.:　US 12,612,166 B2

Crebassol　　　　　　　　　　　　　(45) Date of Patent:　Apr. 28, 2026

(54) METHOD FOR DE-ICING AN AERODYNAMIC WALL USING AT LEAST TWO DIFFERENT DE-ICING SYSTEMS, AIRCRAFT EQUIPPED WITH A DE-ICING DEVICE MAKING IT POSSIBLE TO IMPLEMENT SAID METHOD

(71) Applicant: Airbus Operations SAS, Toulouse (FR)

(72) Inventor: Florent Crebassol, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/742,472

(22) Filed: Jun. 13, 2024

(65) Prior Publication Data

US 2025/0002162 A1　　Jan. 2, 2025

(30) Foreign Application Priority Data

Jun. 28, 2023　(FR) ...................................... 2306750

(51) Int. Cl.
　　B64D 15/12　　　(2006.01)
(52) U.S. Cl.
　　CPC ..................................... B64D 15/12 (2013.01)
(58) Field of Classification Search
　　CPC ...... B64D 15/12; B64D 15/163; B64D 15/16; B64D 15/00
　　See application file for complete search history.

(56) References Cited

U.S. PATENT DOCUMENTS

| | | | |
|---|---|---|---|
| 6,196,500 B1 * | 3/2001 | Al-Khalil | B64D 15/163 244/134 B |
| 2015/0129720 A1 * | 5/2015 | Strobl | B64D 15/16 244/134 F |
| 2016/0114883 A1 | 4/2016 | Guerry et al. | |
| 2019/0291878 A1 * | 9/2019 | Kestler | H05B 3/262 |
| 2023/0365265 A1 | 11/2023 | Bourhis et al. | |
| 2024/0409223 A1 * | 12/2024 | Boissy | F02C 7/047 |

FOREIGN PATENT DOCUMENTS

| | | | | |
|---|---|---|---|---|
| CA | 2000357 A1 | * | 4/1990 | |
| CA | 2227526 A1 | * | 7/1998 | B64D 15/14 |
| CA | 2233282 A1 | * | 10/1998 | B64D 15/00 |
| CA | 2379258 C | * | 7/2008 | B64D 15/12 |
| CA | 2740524 A1 | * | 5/2010 | B29C 35/0272 |
| CA | 2870942 C | * | 9/2019 | B64D 15/12 |

(Continued)

OTHER PUBLICATIONS

Strobl et al. ("Feasibility Study of a Hybrid Ice Protection System"., 2015.*

(Continued)

*Primary Examiner* — Assres H Woldemaryam

(74) *Attorney, Agent, or Firm* — Greer, Burns & Crain, Ltd.

(57) ABSTRACT

A method for de-icing an aerodynamic wall of an aircraft, the method comprising activation of a thermal de-icing system configured to generate at least a localized heating on the outer face of the aerodynamic wall and activation of another de-icing system by elastic deformation configured to deform the aerodynamic wall. Also an aircraft equipped with a de-icing device.

14 Claims, 3 Drawing Sheets

(56)     References Cited

FOREIGN PATENT DOCUMENTS

| | | | | | |
|---|---|---|---|---|---|
| CA | 3095372 | A1 | * | 10/2019 | ............. B32B 27/08 |
| CN | 115042979 | A | | 9/2022 | |
| CN | 116280213 | A | * | 6/2023 | ............. B64D 15/12 |
| EP | 0680878 | A1 | * | 11/1995 | ............. B64D 15/00 |
| EP | 3012187 | A1 | | 4/2016 | |
| EP | 3456635 | A1 | * | 3/2019 | ............. B64D 15/12 |
| EP | 3738882 | A1 | * | 11/2020 | ........... B64C 23/005 |
| EP | 4279388 | A1 | | 11/2023 | |
| FR | 2990927 | A1 | * | 11/2013 | ............. B64D 15/12 |
| WO | WO-2011087412 | A1 | * | 7/2011 | ............... B64C 3/20 |
| WO | WO-2023067266 | A1 | * | 4/2023 | ............. B64D 15/12 |

OTHER PUBLICATIONS

Kamel Al-Khalil; "Thermo-Mechanical Expulsion Deicing System—TMEDS"., 2007.*
French Search Report for corresponding French Patent Application No. 2306750 dated Jan. 10, 2024.

* cited by examiner

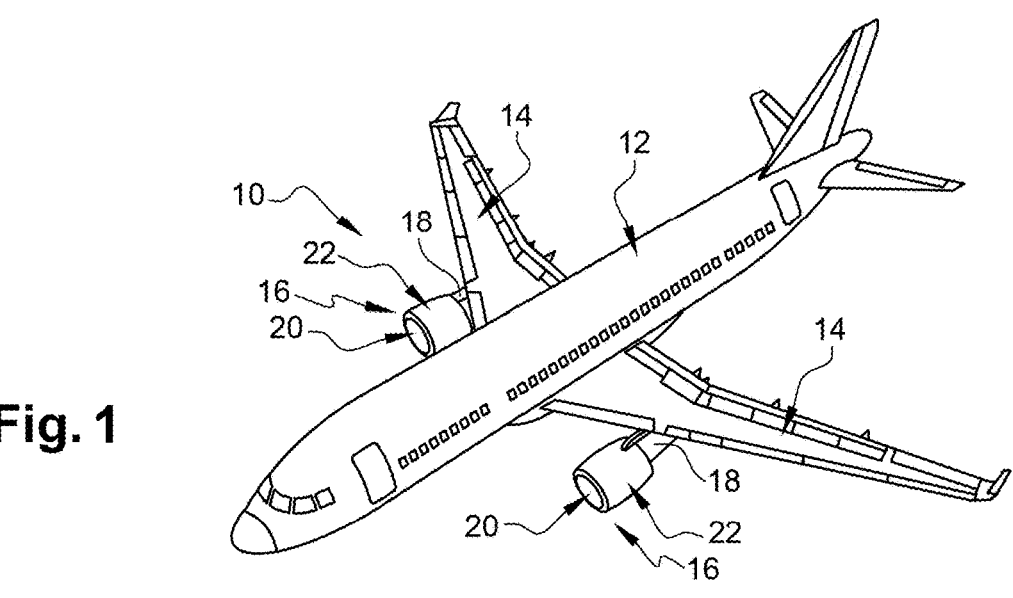
Fig. 1
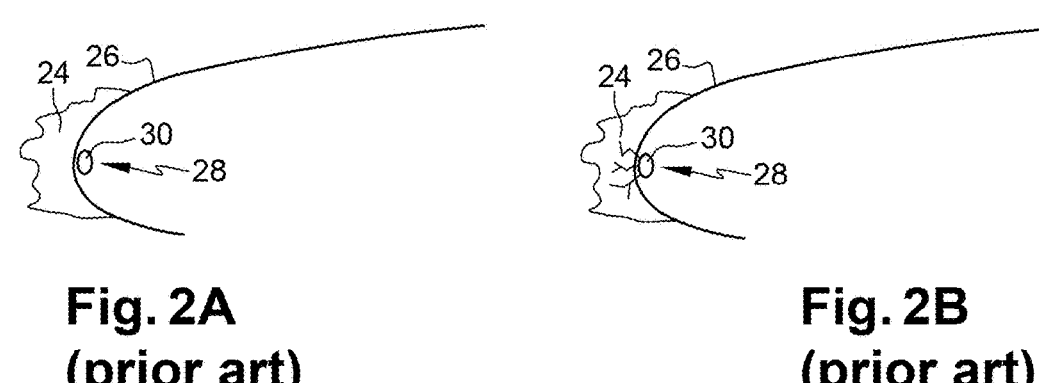
**Fig. 2A
(prior art)**
**Fig. 2B
(prior art)**
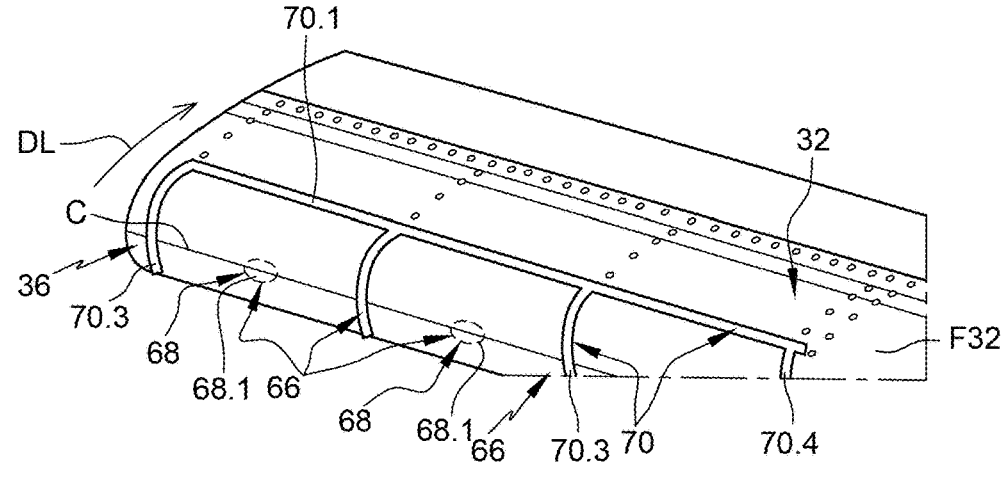
Fig. 3

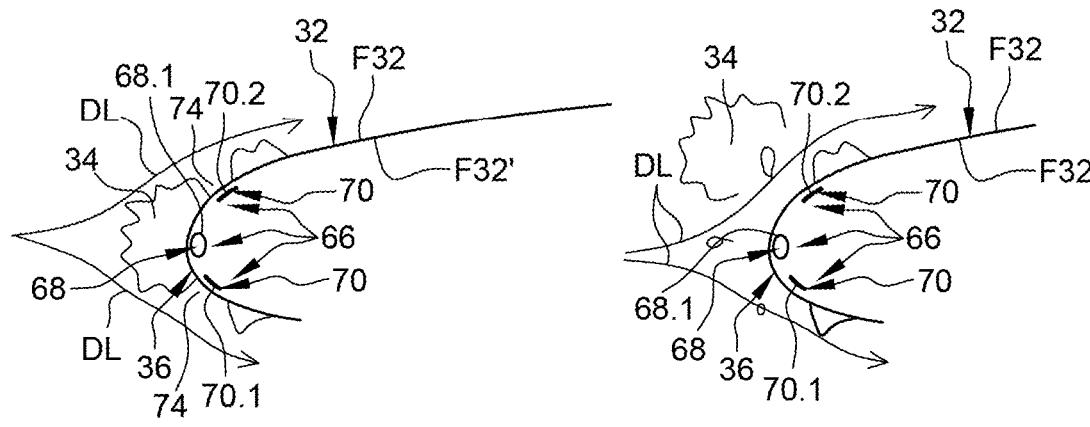
Fig. 4A        Fig. 4B
Fig. 5
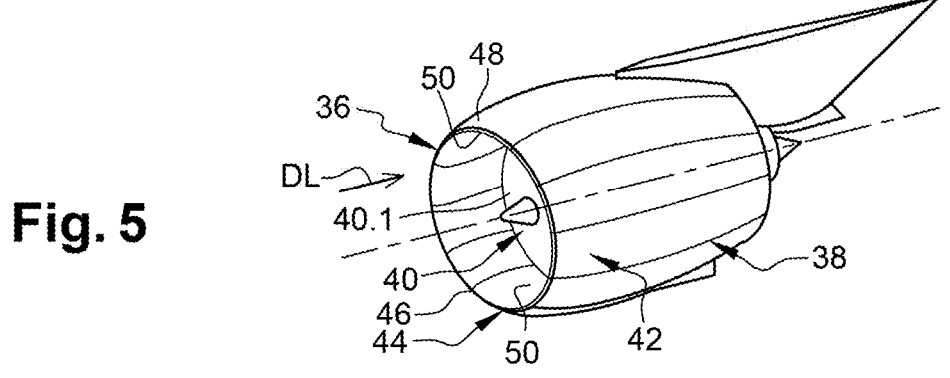
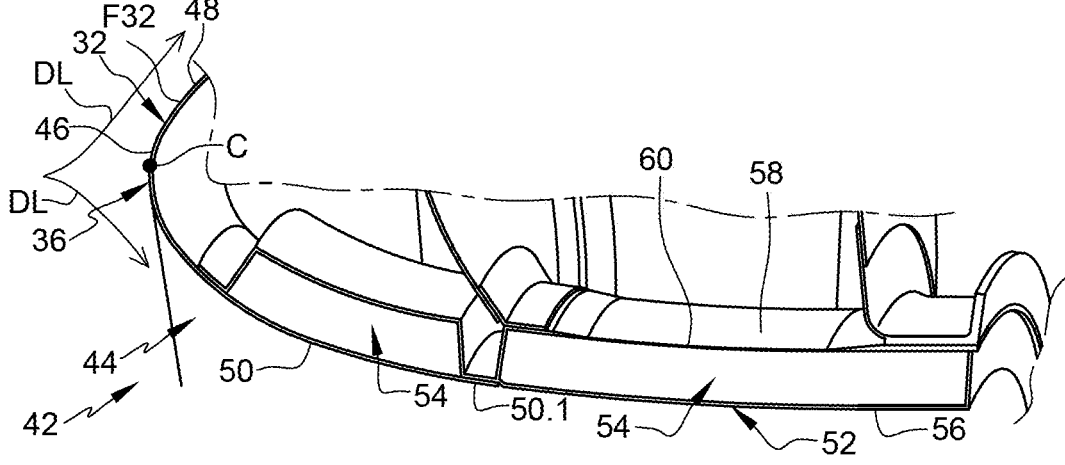
Fig. 6

METHOD FOR DE-ICING AN AERODYNAMIC WALL USING AT LEAST TWO DIFFERENT DE-ICING SYSTEMS, AIRCRAFT EQUIPPED WITH A DE-ICING DEVICE MAKING IT POSSIBLE TO IMPLEMENT SAID METHOD

CROSS-REFERENCES TO RELATED APPLICATIONS

This application claims the benefit of French Patent Application Number 2306750 filed on Jun. 28, 2023, the entire disclosure of which is incorporated herein by way of reference.

FIELD OF THE INVENTION

The present application relates to a method for de-icing a wall using at least two different de-icing systems and an aircraft equipped with a de-icing device that makes it possible to implement said method.

BACKGROUND OF THE INVENTION

According to an embodiment visible in FIG. 1, an aircraft 10 comprises a fuselage 12, wings 14 positioned on either side of the fuselage 12 and propulsion assemblies 16 positioned under the wings 14 and linked thereto by pylons 18. Each propulsion assembly 16 comprises an engine system 20 and a nacelle 22 positioned around the engine system 20.

Depending on the climatic conditions and the flight phases, clusters of ice 24 can be formed on certain aerodynamic walls 26 of the aircraft, like the leading edges. To optimize the flight conditions, these possible clusters of ice must be removed or the formation of such clusters must be limited or prevented. To this end, the aerodynamic walls 26 that lend themselves to the formation of frost or ice can comprise a de-icing system 28, as illustrated in FIGS. 2A and 2B.

For the present application, ice is understood to mean interchangeably frost or ice, and de-icing is understood to be a treatment aiming to limit or prevent the formation of frost and/or of ice and/or to detach the frost and/or the ice from a surface.

According to one embodiment, the de-icing system is of electric type and comprises at least one resistive mat pressed against the inner face of the aerodynamic wall to be treated and covering the entire zone to be treated and a current generator linked to the resistive mat. By circulating in the resistive mat, the electric current generates a heating by Joules effect which prevents or limits the formation of ice. When there is a cluster of ice, a de-icing system of electric type makes it possible to detach the cluster of ice from the aerodynamic wall.

A de-icing system of electric type comprising resistive mats consumes an electrical energy which is notably a function of the surface area covered by the resistive mat, of the duration of activation and of the power per unit of surface area of the resistive mat. In as much as the resistive mat extends continuously over the entire surface area of the zone to be treated and the duration of activation is relatively long, the resistive mats have the drawback of being energy-intensive.

According to another embodiment visible in FIGS. 2A and 2B, the de-icing system 28 is of mechanical type and comprises at least one vibration generator 30, such as a piezoelectric element, positioned against the inner face of the aerodynamic wall 26. When a cluster of ice 24 forms on the outer surface of the aerodynamic wall 26 as illustrated in FIG. 2A, the vibration generator 30 is activated as illustrated in FIG. 2B. When the vibration generator 30 is activated, the vibrations produced by the vibration generator 30 are propagated through the aerodynamic wall 26 and into the cluster of ice 24 which cracks and is detached. Based on the characteristics of the cluster of ice 24 and notably on its thickness, it is necessary to bring the vibration generators 30 close together and therefore increase the number thereof, which is reflected by an increase in the embedded weight and increased energy consumption.

SUMMARY OF THE INVENTION

The present invention aims to remedy all or part of the drawbacks of the prior art.

To this end, a subject of the invention is a method for de-icing an aerodynamic wall of an aircraft, said aerodynamic wall having an outer face against which an air stream can flow in a longitudinal direction and an inner face opposite the outer face.

According to the invention, the method uses at least one first de-icing system configured to be in an activated state in which the first de-icing system generates at least one elastic deformation of the aerodynamic wall and at least one second de-icing system, different from the first de-icing system, configured to be in an activated state in which the second de-icing system generates at least a localized heating on the outer face of the aerodynamic wall, the de-icing method comprising a step of activation of the second de-icing system and a step of activation of the first de-icing system.

When there is a cluster of ice present on the aerodynamic wall, the fact of activating the second de-icing system makes it possible to weaken the cluster of ice by segmenting it into several small blocks, which contributes to reinforcing the effectiveness of the first de-icing system. This solution contributes to reducing the energy consumption of the de-icing device, each of the first and second de-icing systems operating optimally.

According to another feature, the step of activation of the first de-icing system is offset in time by a duration of at least 2 seconds with respect to the step of activation of the second de-icing system.

According to another feature, the step of activation of the second de-icing system is concomitant with the step of activation of the first de-icing system.

According to another feature, the de-icing method comprises a step of de-activation of the second de-icing system concomitant with the step of activation of the first de-icing system.

Also, a subject of the invention is an aircraft comprising an aerodynamic wall and a de-icing device for treating said aerodynamic wall, the latter having an outer face against which an air stream can flow in a longitudinal direction and an inner face opposite the outer face, the de-icing device comprising at least one first de-icing system configured to generate at least one elastic deformation of said aerodynamic wall.

According to the invention, the de-icing device comprises at least one second de-icing system, different from the first de-icing system, configured to generate a localized heating on the outer face of the aerodynamic wall.

According to another feature, the second de-icing system is discontinuous and offset on the aerodynamic wall with respect to the first de-icing system.

According to another feature, the second de-icing system comprises several slender heating elements positioned on the outer face of the aerodynamic wall or in proximity thereto.

According to another feature, the second de-icing system comprises first slender heating elements oriented in at least one first direction substantially at right angles to the longitudinal direction of the air stream.

According to another feature, the second de-icing system comprises second slender heating elements oriented in at least one second direction secant to the first direction, the first and second slender heating elements being secant.

According to another feature, the second direction is substantially at right angles to the first direction.

According to another feature, the slender heating elements each have a given width and are spaced apart from one another by a distance greater than 5 times the given width.

According to another feature, the first de-icing system comprises several elastic deformation generators each positioned between at least two slender heating elements.

According to another feature, each elastic deformation generator is positioned between two first slender heating elements oriented in a first direction and between two second slender heating elements oriented in a second direction secant to the first direction.

According to another feature, the aircraft comprises at least one leading edge having a crest line, the first de-icing system comprising several elastic deformation generators distributed along the crest line, the second de-icing system comprising at least two first slender heating elements oriented in at least one first direction, substantially at right angles to the longitudinal direction of the air stream, and positioned on either side of the crest line.

BRIEF DESCRIPTION OF THE DRAWINGS

Other features and advantages will emerge from the description of the invention which follows, a description that is given by way of example only, in light of the attached drawings in which:

FIG. 1 is a perspective view of an aircraft,

FIG. 2A is a schematic transverse cross-section of an aircraft wall equipped with a prior art de-icing system of mechanical type in the deactivated state;

FIG. 2B is a schematic transverse cross-section of the prior art de-icing system of mechanical type of FIG. 2A in the activated state, FIG. 3 is a perspective view of a part of an aircraft leading edge equipped with a de-icing device illustrating an embodiment of the invention, FIG. 4A is a schematic transverse cross-section of an aircraft wall equipped with a de-icing system of mechanical type illustrating an embodiment of the invention, in the deactivated state, FIG. 4B is a schematic transverse cross-section of an aircraft wall equipped with the de-icing system of mechanical type of FIG. 4A in the activated state, FIG. 5 is a perspective view of a propulsion assembly of an aircraft illustrating an embodiment of the invention, FIG. 6 is a longitudinal cross-section of a part of the propulsion assembly visible in FIG. 5, and, FIG. 7 is a longitudinal cross-section of an acoustic attenuation panel equipped with a de-icing device illustrating an embodiment of the invention.

Figure 7:
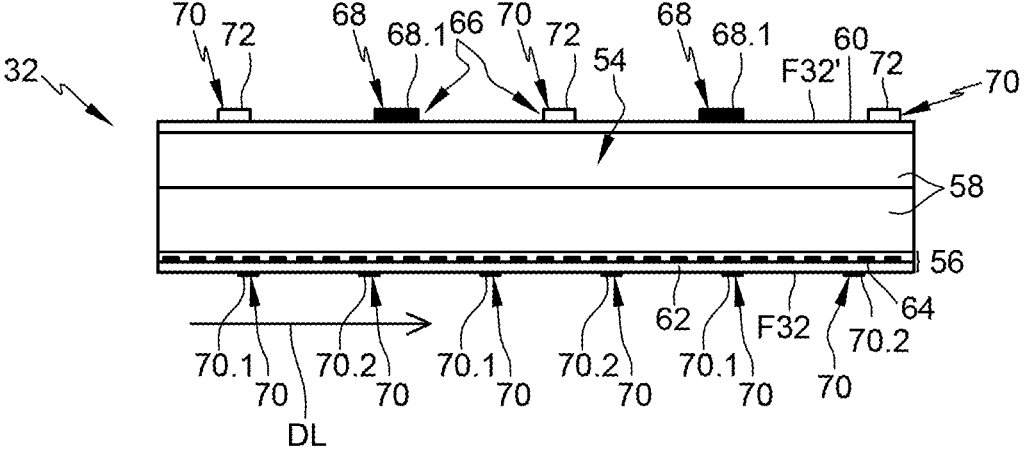

DETAILED DESCRIPTION OF THE
PREFERRED EMBODIMENTS

According to the embodiments visible in FIGS. 3, 4A, 4B, and 7, an aerodynamic wall 32 of an aircraft has an outer face F32 against which an air stream can flow when the aircraft is in flight and on which ice can form, notably a cluster of ice 34 (visible in FIGS. 4A and 4B) and an inner face F32' opposite the outer face F32. The air stream flows in a longitudinal direction DL. A transverse plane is at right angles to the longitudinal direction. A transverse direction is at right angles to the longitudinal direction and parallel to the outer face F32.

According to an application visible in FIG. 3, the aerodynamic wall 32 forms at least a part of a leading edge 36 of a wing of an aircraft.

According to an embodiment visible in FIGS. 5 and 6, a propulsion assembly 38 comprises an engine system 40 and a nacelle 42 positioned around the engine system 40. The nacelle 42 comprises, at the front, an air intake 44 configured to channel an air stream towards the engine system 40 and notably to a fan 40.1 of the engine system 40. This air intake 44 comprises a lip 46 which forms a circular leading edge, an outer wall 48 prolonging the lip 46 towards the outside of the nacelle 42 and an inner duct 50 prolonging the lip 46 towards the interior of the nacelle 42. This inner duct 50 comprises a rear edge 50.1 linked to a fan casing 52 positioned around the fan 40.1 of the engine system 40.

According to one application, the aerodynamic wall 32 forms at least a part of the air intake 44 of an aircraft nacelle.

Obviously, the invention is not limited to these applications. Thus, the aerodynamic wall can be positioned at different points of an aircraft.

According to one embodiment, the aerodynamic wall 32 takes the form of a continuous and solid sheet or plate between the outer and inner faces F32, F32'.

According to another embodiment, the aerodynamic wall 32 takes the form of an acoustic attenuation panel 54 positioned at the lip 46 and/or the inner duct 50 of the air intake 44 of an aircraft nacelle 42. This acoustic attenuation panel 54 comprises, from the outer face F32 to the inner face F32', an acoustically resistive structure 56 of which one surface forms the outer face F32, at least one cellular structure 58 and a reflective layer 60 of which one face forms the inner face F32'.

The reflective layer 60 comprises at least one thin plate, metallic or made of composite material, impermeable to soundwaves. The cellular structure 58 can be metallic or made of composite material.

According to an embodiment visible in FIG. 7, the acoustically resistive structure 56 comprises at least one porous layer 62 made of composite material passed through by orifices and configured as a function of the acoustic characteristics sought for the acoustic attenuation panel 54. In addition, the acoustically resistive structure 56 can comprise at least one winding 64 made of composite material, positioned between the cellular structure 58 and the porous layer 62. The acoustically resistive structure 56 can also comprise at least one lightning protection layer in the form of a metal lattice or grid.

According to another feature, the acoustically resistive structure 56 comprises at least one metallic porous layer passed through by orifices and configured as a function of the acoustic characteristics sought for the acoustic attenuation panel.

Obviously, the invention is not limited to these embodiments for the aerodynamic wall 32.

According to one embodiment, an aircraft comprises an aerodynamic wall 32 and a de-icing device 66 for treating said aerodynamic wall 32, which comprises at least one first de-icing system 68 by elastic deformation of the aerodynamic wall 32 and at least one second de-icing system 70 configured to act locally on the outer face F32 of the aerodynamic wall 32 so as to locally weaken the cluster of ice 34.

The first de-icing system 68 is configured to generate an elastic deformation of the aerodynamic wall 32 from a spot zone (localized and reduced) and comprises at least one elastic deformation generator 68.1 configured to generate a shock, a wave, vibrations or a weak displacement and transmit it or them to the aerodynamic wall 32 in a localized manner.

According to one embodiment, the first de-icing system 68 is of mechanical type and comprises at least one vibration generator 68.1 coupled to the aerodynamic wall 32 and configured to transform an electrical energy into vibrational energy and at least one electrical power supply configured to supply electrical energy to the vibration generator 68.1. Each vibration generator 68.1 is a spot element covering a small zone of the aerodynamic wall 32. As an example, each vibration generator 68.1 is a piezoelectric element.

According to one configuration, the first de-icing system 68 comprises several vibration generators 68.1 distributed on the aerodynamic wall 32. According to one arrangement, each vibration generator 68.1 is positioned against the inner face F32'. Obviously, the invention is not limited to this arrangement. In the case of an acoustic attenuation panel 54, the vibration generator or generators 68.1 could be incorporated in the acoustic attenuation panel 54, notably in its cellular structure 58.

The first de-icing system 68 is configured to be in a deactivated state in which it generates no elastic deformation and an activated state in which it generates at least an elastic deformation of the aerodynamic wall 32. In the case of a first de-icing system 68 of mechanical type, it is configured to be in a deactivated state in which the vibration generator or generators 68.1 does or do not generate vibrations and an activated state in which the vibration generator or generators does or do generate vibrations. To this end, the first de-icing system 68 comprises at least one first control configured to drive a change of state out of the activated and deactivated states. As a variant, the first de-icing system 68 can be permanently in the activated state.

According to one embodiment, the second de-icing system 70 is of thermal type and configured to generate a localized heating on the outer face F32 of the aerodynamic wall 32, which makes it possible to locally weaken the cluster of ice 34 by locally reducing its thickness and/or by locally limiting the adhesion of the cluster of ice 34 on the aerodynamic wall 32.

According to a first variant, the second de-icing system 70 is of electric type and comprises several strips of electrically conductive material 70.1 to 70.4 positioned on the outer face F32 of the aerodynamic wall 32 or in proximity thereto. Each of these strips of electrically conductive material 70.1 to 70.4 is configured to produce a heating when it is passed through by an electric current.

According to one configuration, the strips of electrically conductive material 70.1 to 70.4 are of resistive type. In addition, the de-icing system of electric type 70 comprises at least one electrical power supply directly linked to the strips of electrically conductive material 70.1 to 70.4.

According to another configuration, the strips of electrically conductive material 70.1 to 70.4 are of inductive type.

In addition, the de-icing system of electric type 70 comprises at least one electromagnetic field generator 72 (like an electrical coil for example) positioned on the inner face F32' and powered by at least one electrical power supply, the strips of electrically conductive material 70.1 to 70.4 being positioned in the electromagnetic field produced by the electromagnetic field generator 72 and configured to generate a heating through an induction effect.

According to a second variant, the second de-icing system 70 is of fluidic type and comprises several ducts configured to convey a hot fluid, like hot air taken at the engine system of the aircraft, positioned at the aerodynamic wall 32.

Whatever the variant, the second de-icing system 70 comprises slender heating elements 70.1 to 70.4, namely strips of electrically conductive material or hot fluid ducts, positioned on the outer face F32 of the aerodynamic wall 32 or in proximity thereto.

The second de-icing system 70 is configured to be in a deactivated state in which it generates no heating and an activated state in which it generates at least a localized heating. In the case of a second de-icing system 70 of electric type, it is configured to be in an activated state in which the strips of electrically conductive material 70.1 to 70.4 generate no heating and an activated state in which the strips of electrically conductive material 70.1 to 70.4 generate a heating. To this end, the de-icing system of electric type 70 comprises at least one second control configured to drive a change of state from among the activated and deactivated states. As a variant, the second de-icing system 70 can be permanently in the activated state.

According to one embodiment, the slender heating elements 70.1, 70.2 are oriented in a first direction substantially (+/−10%) parallel to the transverse direction (at right angles to the longitudinal direction of the air stream).

According to a first arrangement, the leading edge 36 equipped with the de-icing device 66 comprises a crest line C corresponding to the line of the aerodynamic wall 32 that is positioned furthest forward (the front/rear concepts referring to the direction of flow of the air stream which flows from the front to the rear). In this case, the first de-icing system 68 comprises several elastic deformation generators 68.1 distributed along the crest line C and at least two slender heating elements 70.1, 70.2 oriented in the first direction and positioned on either side of the crest line C. Thus, each first de-icing system 68 is positioned between two slender heating elements 70.1, 70.2 oriented in the first direction.

According to a second arrangement visible in FIG. 3, the second de-icing system 70 comprises first slender heating elements 70.1, 70.2 oriented in the first direction and second slender heating elements 70.3, 70.4 oriented in at least one second direction secant to the first direction, notably at right angles to the first direction, the first and second slender heating elements 70.1 to 70.4 being secant. According to this second arrangement, each elastic deformation generator 68.1 of the first de-icing system 68 is positioned between two first slender heating elements 70.1, 70.2 oriented in the first direction and between two second slender heating elements 70.3, 70.4.

According to one embodiment, the slender heating elements 70.1 to 70.4 each have a given width, of the order of 1 to 5 cm, and are spaced apart from one another by a distance greater than 5 times the given width.

Obviously, the invention is not limited to these embodiments for the first and second de-icing systems 68, 70. Whatever the embodiment, the second de-icing system 70 is configured to segment the cluster of ice 34 by dividing it into small blocks of ice and the first de-icing system 68 is configured to detach these small blocks of ice from the aerodynamic wall 32. Thus, the second de-icing system 70 makes it possible to optimize the operation of the first de-icing system 68. According to one arrangement, each second de-icing system 70 is discontinuous (and does not cover the entire surface to be treated) and offset on the aerodynamic wall 32 with respect to the first de-icing system 68. According to one configuration, the first de-icing system 68 comprises several elastic deformation generators 68.1 distributed along at least one line positioned in a plane substantially at right angles to the air stream which flows over the outer face F32 of the aerodynamic wall 32. In the case of a leading edge, this line of installation of the elastic deformation generators 68.1 corresponds to the crest line (C). According to one configuration, each elastic deformation generator 68.1 is positioned between at least two slender heating elements 70.1 to 70.4 and substantially equidistant from said slender heating elements 70.1 to 70.4.

Also a subject of the invention is a method for de-icing the aerodynamic wall 32 using at least one first de-icing system 68 configured to be in an activated state in which it generates at least one elastic deformation of the aerodynamic wall 32 and a deactivated state in which it generates no elastic deformation and at least one second de-icing system 70, different from the first de-icing system 68, configured to be in an activated state in which it generates at least a localized heating on the outer face F32 of the aerodynamic wall and a deactivated state in which it generates no heating. The de-icing method comprises a step of activation of the second de-icing system 70 aiming to switch the second de-icing system from the deactivated state to the activated state and a step of activation of the first de-icing system 68 aiming to switch the first de-icing system 68 from the deactivated state to the activated state.

The fact of activating the second de-icing system 70 makes it possible to weaken the cluster of ice 34 by segmenting it into several small blocks, which contributes to reinforcing the effectiveness of the first de-icing system 68. This solution contributes to reducing the energy consumption of the de-icing device, each of the first and second de-icing systems operating optimally.

According to one procedure, the step of activation of the first de-icing system 68 is offset in time by a duration of at least 2 seconds with respect to the step of activation of the second de-icing system 70.

The first de-icing system 68 is in the activated state for a very short duration, less than 2 seconds, or even of the order of a fraction of a second.

The second de-icing system 70 has a longer mode of operation, greater than 2 seconds. Thus, the de-icing method comprises a step of deactivation of the second de-icing system 70 concomitant with the step of activation of the first de-icing system 68.

According to another procedure, the step of activation of the second de-icing system 70 is concomitant with the step of activation of the first de-icing system 68.

In operation, the second de-icing systems 70 are switched to the activated state so as to provoke a heating in line with each slender heating element 70.1 to 70.4, as illustrated in FIG. 4A. Since the slender heating elements 70.1 to 70.4 do not cover the entire surface to be treated but at most 20% of this surface discontinuously, the second de-icing systems 70 have an energy consumption that is clearly lower than that of a resistive mat of the prior art continuously covering the entire surface to be treated.

After a reduced delay, the cluster of ice 34 is embrittled in line with the slender heating elements 70.1 to 70.4 and comprises zones of reduced thickness 74 in line therewith. After the operation of the second de-icing system 70, the cluster of ice 34 no longer forms a single large compact block. It is segmented into several small blocks of ice that are easier to detach. The first de-icing system 68 is then switched to the activated state. Contrary to the prior art, the cluster of ice 34 being already embrittled in line with the slender heating elements 70.1 to 70.4, the action of the first de-icing systems 68 requires less energy compared to the prior art to detach the cluster of ice 34. According to another advantage, when the slender heating elements 70.1, 70.2 are oriented at right angles to the air stream, the zones of reduced thickness 74 offer a wind resistance for the air stream, which promotes the detachment of the blocks of ice.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for de-icing an aerodynamic wall of an aircraft, said aerodynamic wall having an outer face against which an air stream flows in a longitudinal direction and an inner face opposite the outer face, wherein the method comprises:

providing at least one first de-icing system configured to be in an activated state in which the at least one first de-icing system generates at least one elastic deformation of the aerodynamic wall and at least one second de-icing system, different from the at least one first de-icing system, configured to be in an activated state in which the at least one second de-icing system generates at least a localized heating on the outer face of the aerodynamic wall;

activating the at least one second de-icing system; and, activating the at least one first de-icing system, wherein the at least one first de-icing system is positioned between and spaced from slender heating elements of the at least one second de-icing system such that the at least one second de-icing system completely surrounds the at least one first de-icing system, wherein activating the at least one second de-icing system embrittles a cluster of ice adhered to said aerodynamic wall in line with the slender heating elements and the cluster of ice comprises zones of reduced thickness in line with the slender heating elements.

2. The method according to claim 1, wherein activating the at least one first de-icing system is offset in time by a duration of at least 2 seconds with respect to activating the at least one second de-icing system.

3. The method according to claim 1, wherein activating the at least one second de-icing system is concomitant with activating the at least one first de-icing system.

4. The method according to claim 3, further comprising:

deactivating the at least one second de-icing system concomitant with activating the at least one first de-icing system.

5. An aircraft comprising:

an aerodynamic wall and a de-icing device for treating said aerodynamic wall, the aerodynamic wall having an outer face against which an air stream flows in a longitudinal direction and an inner face opposite the outer face, the de-icing device comprising at least one first de-icing system configured to generate at least one elastic deformation of said aerodynamic wall, wherein the de-icing device further comprises at least one second de-icing system, different from the at least one first de-icing system, configured to generate a localized heating on the outer face of the aerodynamic wall, wherein the at least one first de-icing system is positioned between and spaced from slender heating elements of the at least one second de-icing system such that the at least one second de-icing system completely surrounds the at least one first de-icing system, wherein activating the at least one second de-icing system embrittles a cluster of ice adhered to said aerodynamic wall in line with the slender heating elements and the cluster of ice comprises zones of reduced thickness in line with the slender heating elements.

6. The aircraft according to claim 5, wherein the at least one second de-icing system is discontinuous and offset on the aerodynamic wall with respect to the at least one first de-icing system.

7. The aircraft according to claim 6, wherein the heating elements are positioned on the outer face of the aerodynamic wall or in proximity thereto.

8. The aircraft according to claim 7, wherein the heating elements comprise first heating elements oriented in at least one first direction substantially at right angles to the longitudinal direction of the air stream.

9. The aircraft according to claim 8, wherein the heating elements comprise second heating elements oriented in at least one second direction secant to the at least one first direction, the first and second heating elements being secant.

10. The aircraft according to claim 9, wherein the at least one second direction is substantially at a right angle to the at least one first direction.

11. The aircraft according to claim 7, wherein the heating elements each have a width and are spaced apart from one another by a distance greater than 5 times the width.

12. The aircraft according to claim 7, wherein the at least one first de-icing system comprises several elastic deformation generators each positioned between at least two heating elements.

13. The aircraft according to claim 12, wherein each elastic deformation generator is positioned between two first heating elements oriented in a first direction and between two second heating elements oriented in a second direction secant to the first direction.

14. The aircraft according to claim 7, further comprising:

at least one leading edge having a crest line, wherein the at least one first de-icing system comprises several elastic deformation generators distributed along the crest line, and wherein the at least one second de-icing system comprises at least two first heating elements oriented in at least one first direction, substantially at a right angle to the longitudinal direction of the air stream, and positioned on either side of the crest line.

*   *   *   *   *